Patented June 28, 1938

2,121,844

UNITED STATES PATENT OFFICE 2,121,844

COMPOSITION AND PROCESS OF MAKING SAME

Andrew Weisenburg, Philadelphia, Pa., assignor to Crown Cork & Seal Company, Inc., Baltimore, Md., a corporation of New York No Drawing. Application November 22, 1930, Serial No. 497,615. Renewed June 18, 1937

5 Claims. (Cl. 134—26)

This invention relates to a binding composition, more particularly applicable in connection with granulated materials, such as cork, wood, and other natural and artificial substances.

The purpose of the binder and its principal object is to exert a binding function and favorably affect the color in comparison with the natural product and, at the same time, impart the necessary tensile strength. It is a further object of the invention to produce a binding composition which will be insoluble in most fluids and inert with respect to acid and alkalies. Also, the binding composition of the present invention is free from any objectionable odors, is highly heat resistant, and is resistant to mold growth in damp atmospheres.

Briefly stated, the present invention contemplates a mixture of two aldehyde condensation products with or without a protein substance in such a manner that the favorable characteristics of the several ingredients are availed of to produce a binder having all the requirements of flexibility, strength and resistance to natural and chemical forces to meet the various conditions of use.

The process of preparing my improved binder may, of course, be varied, but I shall describe a preferred method as one which has proven satisfactory under tests.

One member of my composition will comprise a phenol formaldehyde condensation product which, as well known, has great strength as a binder and is insoluble in most liquids, acids and alkalies when finally set. However, such a product usually possesses a dark color, making it unsatisfactory for the production of discs or liners for use in connection with food products and more particularly pressure and still beverages.

While I have mentioned a phenol formaldehyde condensation product, it will be understood that I may employ any of the homologues and for the formaldehyde I may substitute equivalents thereof, such as paraformaldehyde, or other aldehyde compounds.

In preparing the condensation product and by way of example, I add twenty (20) parts forty per cent (40%) formaldehyde and one and one-half (1½) parts oxalic acid to twenty-six (26) parts ninety per cent (90%) phenol. These quantities are given merely as illustrations of the phenol resin which I prefer, since they can obviously be departed from.

The oxalic acid I have found acts as a catalyst and favorably influences the color of the resultant product and likewise its strength. In other words, a much paler or light colored resin is produced by the catalytic effect of the organic acid and the strength of the binder is improved. Moreover, the use of a catalyst, such as an organic acid, renders the resultant condensation product such that it may be readily mixed with other condensation products to produce the binder of this invention.

The above mixture is subjected to heat until the condensation product appears as a pale sticky mass. The reaction is then stopped by the addition of cold water. The resultant resin in its intermediate stage is washed and kneaded several times, first in cold water, and then in hot water, to which a little ammonia is added. This repeated washing eliminates all excess acid, and tends to remove the excess phenol. After the resin is washed, it is subjected to heat and the reaction carried to a point where the resin on testing a small sample, when cold, is hard and brittle and not tacky. At this point, by the addition of suitable resin plasticizer, such as diethylene, glycol, glycerine and other similar organic materials or combinations thereof, I obtain a solution of the resin in the plasticizer suitable for forming the necessary binder. Such a solution, moreover, will keep almost indefinitely in this state without change.

In referring to plasticizers of the polyhydric alcohol type, I mean a plasticizer which is both a solvent for the resins as well as forms a plastic mass in which the granulated cork is included. The present solution, as understood, forms a coating upon the individual cork particles which are in loose separable condition so that they may be fed to the usual rod packer mechanism employed in making the rods from which the cork discs are ultimately severed. As understood in the art, these rod packers form the cork into a rod of required density and the rod is heated while in such compressed condition to cure the resin. It is important, therefore, to have a plasticizer which will form a plastic mass with the cork and will make the relatively thin discs or cushions flexible and resilient and permanently maintain them so.

The second member of my composition comprises a urea aldehyde condensation product and while I shall mention by example urea and formaldehyde, I have found that various derivatives of urea, such as thio-urea, guanidine, and others may be satisfactorily employed, and also in place of formaldehyde, paraformaldehyde or other aldehyde compounds are satisfactory.

In forming the second member twenty-four (24) parts of urea are dissolved in sixty (60) parts of forty per cent (40%) formaldehyde to which one part of commercial ammonia solution is added, and reacting under heat until a clear solution is obtained. Care must be taken that the reaction is not carried too far, since otherwise an insoluble urea condensation product may result. Such an insoluble mass, must be avoided since otherwise it will not mix or go into solution with the phenol resin plasticizer solution or mixture. In other words, the urea resin, like the phenol resin, is maintained in the intermediate stage. The proportions indicated above are given merely by way of example and can be departed from as required. In making this condensation product special care and precaution must be taken not to start reaction during the progress of the solution.

The clear urea condensation product thus produced and while still hot is mixed with the phenol formaldehyde plasticizer solution. The resultant mixture of condensation products, i. e. phenol and urea resins in intermediate stage will keep without change under normal conditions practically indefinitely.

The phenol and urea resins and plasticizer can be mixed in varying proportions, depending upon the characteristics and properties desired in the final binder composition, such as strength, flexibility, hardness, color and heat resistance. Obviously, the applications of the binder are so varied, that for the various purposes particular characteristics are required, and these can be easily adjusted by varying the proportions of the members of the mixture or solution.

To accelerate the setting of this synthetic resin binder and obtain its full efficiency in an economic time cycle, a hardening agent is preferably employed. I have found that organic acids are satisfactory for this purpose and preferably oxalic acid which, when the binder is employed in a cork composition, produces a light colored cork which is much desired. The oxalic acid is preferably dissolved in its own weight of a material which will also exert a further physical effect on the natural granulated material, such as cork, for example a resin plasticizer such as diethylene glycol or glycerine.

In referring to the use of an organic acid, both as a catalytic agent and as a hardening member, it will be understood that other acids, such as tartaric, citric, lactic, phthalic anhydride, acetic, particularly polybasic acids, have been found quite satisfactory for these functions.

For producing a cork composition satisfactory for a number of general purposes, and as merely illustrative of one example, fifty (50) parts of cork are added to eighteen (18) parts of mixed resin binder dissolved in the plasticizer, as above described, and one and one-half (1½) parts of oxalic acid dissolved in a like amount of diethylene glycol. The resultant body mass, as is customary, is loose, non-adherent and free flowing, whereby the binder coated cork particles can be passed by gravity in the usual manner to the measuring devices associated with cork composition rod or block forming machines.

Such a composition will impart flexibility, great tensile strength and, moreover, the cork will possess a pleasing light color, very similar to that of the natural product. Moreover, the binder will be resistant to the action of most fluids, its insoluble characteristic being extremely high, and will not be attacked by acid or alkali solutions. A further feature resides in the fact that phenolic or objectionable odors are eliminated, and mold growth, such as takes place in damp atmospheres, is entirely inhibited. The binding composition is, moreover, heat resistant to a remarkable degree and, in this connection, it can be used satisfactorily in connection with internal engine gaskets and packings, as well as a liner or seal for food products and beverages, since it will withstand the high temperatures incident to sterilization and cooking.

It will be understood, moreover, while I have described the composition as peculiarly adapted for binding purposes with granulated materials, it likewise has distinct advantages as a coating or impregnation product, and will also form a base or ingredient for paints, varnishes and other coating preparations.

The final product when set is sufficiently hard and possessing the characteristics above outlined, will be useful in many applications.

I have found, furthermore, that the above solution of phenol and urea resin in plasticizers will mix with solutions of proteid substances, such as gelatin, casein, and albumen, as well as other proteins. The protein may be added to the phenol urea resin solution or a portion of the phenol urea resin solution may be added to a solution of the protein: In either case, it has been found that the mixed resin binder and the protein exert a very desirable effect when the binder is employed in producing a cork or other composition. In this connection, I have found that a satisfactory cork composition, for example, can be made with fifty (50) parts of cork, fourteen (14) parts synthetic resin binder, four (4) parts of gelatin solution, and one and one-half (1½) parts of oxalic acid dissolved in a like amount of diethylene glycol.

It appears that the protein binder when used with the phenol urea resin binder has been found to exert an effect which has heretofore not been accomplished with known and conventional binding compositions.

The new composition, including the protein possessing all of the characteristics above described, increases the resiliency and flexibility of the resultant product and, moreover, for economic purposes in many instances, reduces expense. With a binding composition containing as much as fifty per cent (50%) gelatin solution, the properties of the synthetic resin binder have been found to be not materially altered, and such composition containing a relatively large proportion of the protein possesses all of the characteristics of tensile strength, insolubility, heat resistance, inhibition of mold growth, pleasant color, freedom from objectionable odors, and will not be attacked by acids and alkalies.

The binding composition of the present invention, as will be understood, when combined in the usual manner with the granulated material and subjected to heat and pressure will produce a satisfactory binding agent, and likewise impart to the product all of the desirable properties which its association or application may require. Moreover, the granules or particles will be thoroughly coated, as well as bound together, and hence the use of the binder not only serves this function, but likewise acts as a protecting surface since many natural and artificial granulated products will be susceptible to acids, alkalies, and other possible chemical reaction with substances to which they may be exposed. This is particularly true in connection with food compounds, as well as pressure and still beverages and in connection with the latter, I have found that the present binder will overcome the heretofore extremely objectionable reactions due to the presence of tannic acid in the cork or other granular substance. I am not in a position to state definitely just how this much desired result is chemically attained, but from various tests using other synthetic resin binding agents, in comparison with the binding agent of the present invention, I have discovered that where heretofore albumen has been precipitated from beer by the reaction of the tannic acid in the cork, with the present invention this is overcome. I strongly believe that this beneficial result is attained by the addition of a protein substance to the aldehyde resin mixture.

In the use of the present invention, as stated, color which has heretofore been a serious obstacle in compounding such granular materials as cork and wood, has been effectively solved, in that the objectionable dark color of the phenol aldehyde condensation product is completely overcome.

Moreover, it will be understood that I have combined a phenol formaldehyde resin which inherently possesses great strength as a binder and is very insoluble and cannot be attacked by most acids and alkalies when finally set and a urea condensation product being a clear water colored resin with no odor, but not possessing quite as good insolubility and acid and alkali resistant qualities of the phenol resin. However, the combination of these two enables me to produce a final product having all of the requirements which are fully above set forth, and which, at the same time, is free from any objectionable odor.

The use of one of the members of the phenol aldehyde series mixed with one of the members of the urea aldehyde series, I have also found enables the setting or curing of the resin mixture or the combined cork resin composition to be accomplished in an economic time cycle and the urea member operates to accelerate the curing in a most convenient and inexpensive manner. This is particularly advantageous in connection with cork compositions where I have found that the use of a phenol aldehyde alone prevents an economic curing or setting cycle.

The binding and coating composition herein described enables discs, rings and liners of various kinds formed of granulated cork or other material to be produced which, in the case of cork, are of excellent color and appearance and, at the same time, possess increased flexibility, resiliency and tensile strength.

A natural product such as cork disk, sheet, block or other article may be coated with the mixture herein described to produce a protected surface, and it will be understood the invention is not solely confined to use with granulated materials.

While I have indicated condensation products of the phenol and urea aldehyde series, it will be understood that I do not wish to be limited to these, since other synthetic resins may be substituted for one or both of the condensation products mentioned.

In the manufacture of articles from granulated cork and the binder herein disclosed, the resin plasticizer solution and granulated cork in the required proportions are mixed in a mechanical mixer until the cork particles are thoroughly coated. The cork binder mixture comprising a loose, non-adherent, free flowing body mass of cork particles coated with the binder is then packed by a mechanical means in either tubes or molds under pressure, this pressure varying according to the density or property required in the finished product. The tube or mold is passed mechanically through an oven at temperatures from 250° to 350° F. and subjected to this temperature for a period varying from a few minutes to several hours. Time and temperature are variant and will depend in many cases upon the size of the tube or mold.

The granulated cork binder mixture can also be extruded through a heated tube, in which tube the pressure is formed by the frictional resistance of the cork. The extruded end of the tube is usually cooled so that the cork composition is more or less set before leaving the extruding tube. This is done to prevent the swelling of the cork composition.

It will be understood that after the phenolic binder member has been cured or set, it is chemically inert, and hence the cork composition of this invention is useful as a liner for containers in medicines, foods, and any other products in which there are active chemical ingredients.

With respect to the solutions of protein substances, such as casein, gelatin, albumen and others, these may be dissolved in water, with or without the addition of various chemicals to accelerate the solution. The plasticizers, such as glycerine, diethylene glycol, or combinations thereof, can also be added in varying quantities.

As one typical example, casein solution can be made up as follows: sixty (60) parts casein, one hundred (100) parts water, eighty (80) parts glycerine, and five (5) parts ammonia.

The proportions with which the various ingredients are combined, of course, are subject to great modification and change as has heretofore been described, and the claims appended are to be broadly construed.

I claim:

1. Binder coated comminuted cork in a free flowing state comprising a body mass of comminuted cork and a binder, said binder comprising a phenol aldehyde condensation product and a urea aldehyde condensation product in an intermediate stage and in solution in a plasticizer selected from a group consisting of diethylene glycol and glycerine, forming a film upon the surfaces of the comminuted cork.

2. A binder solution for application to the surfaces of comminuted cork to form a body mass of loose, non-adherent, uncured, binder coated cork particles, said solution comprising a mixture of a phenol aldehyde condensation product and a urea aldehyde condensation product, each said product in an intermediate stage and in solution in a solvent consisting of a plasticizer selected from a group consisting of diethylene-glycol and glycerine.

3. A binder solution for application to the surfaces of comminuted cork to form a body mass of loose, non-adherent, uncured, binder coated cork particles, said solution comprising a mixture of a phenol aldehyde condensation product and a urea aldehyde condensation product in a resin solvent consisting of an organic plasticizer, and a proteid, each said product being in an intermediate stage.

4. A binder solution for application to the surfaces of comminuted cork to form a body mass of loose, non-adherent, uncured, binder coated cork particles, said solution comprising a mixture of a phenol aldehyde condensation product and a urea aldehyde condensation product, and a proteid, each said product being in an intermediate stage, and in solution in a resin solvent consisting of an organic plasticizer.

5. A binder solution for application to the surfaces of comminuted cork to form a body mass of loose, non-adherent, uncured, binder coated particles, said solution comprising a mixture of phenol aldehyde condensation product, a urea aldehyde condensation product, an organic plasticizer and solvent for the resins consisting of a polyhedric alcohol, a proteid and a hardening agent, the resins being in solution in said plasticizer and solvent, and said solution in uncured state forming a non-adherent film upon the cork particles capable of being cured or set by heat and pressure to bind the particles together and maintain the cork body flexible and resilient.

ANDREW WEISENBURG.